Figure 2:
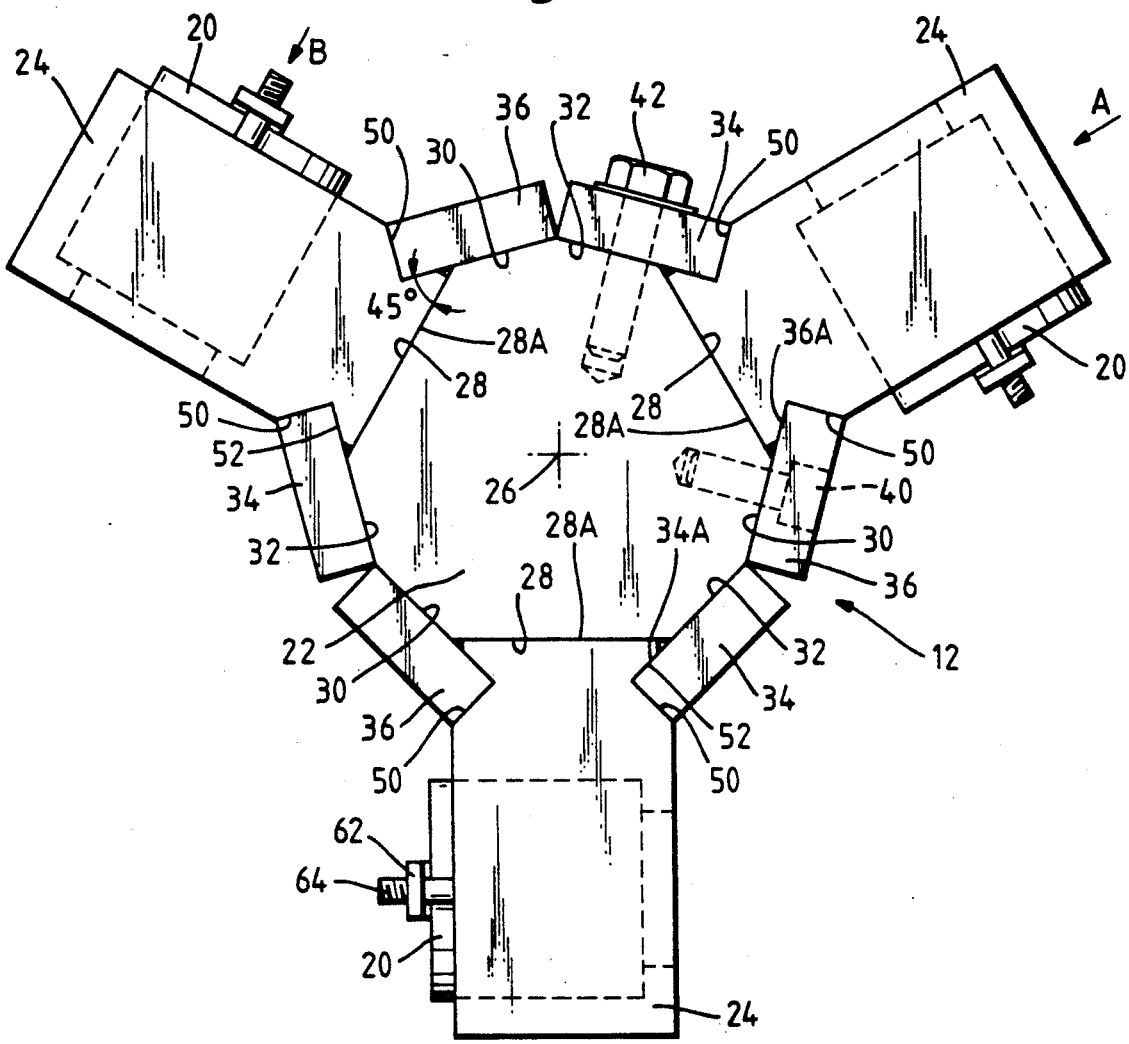

United States Patent [19]

McMurtry

[11] Patent Number: 5,212,857
[45] Date of Patent: May 25, 1993

[54] MODULAR MULTI-FIXTURING SYSTEM FOR A MACHINE TOOL

[75] Inventor: David R. McMurtry, Wotton-Under-Edge, United Kingdom

[73] Assignee: Renishaw plc, Gloucestershire, United Kingdom

[21] Appl. No.: 689,748

[22] PCT Filed: Sep. 21, 1990

[86] PCT No.: PCT/GB90/01460

§ 371 Date: May 22, 1991

§ 102(e) Date: May 22, 1991

[87] PCT Pub. No.: WO91/04127

PCT Pub. Date: Apr. 4, 1991

[30] Foreign Application Priority Data

Sep. 22, 1989 [GB] United Kingdom ............... 8921449
Nov. 30, 1989 [GB] United Kingdom ............... 8927043

[51] Int. Cl.$^5$ .................................... B23Q 7/02
[52] U.S. Cl. ................................ 29/38 C; 409/221
[58] Field of Search ................. 29/33 P, 563, 38 C, 29/38 R; 409/164, 168, 158, 165, 172, 221, 225, 224; 269/900, 294, 292, 293, 303

[56] References Cited

U.S. PATENT DOCUMENTS

| | | | |
|---|---|---|---|
| 2,418,070 | 3/1947 | Green | 29/38 C X |
| 2,558,283 | 6/1951 | Wharton et al. | 409/221 |
| 3,336,823 | 8/1967 | Bonzi | 409/165 |
| 3,412,644 | 11/1968 | Poorman | 409/224 X |
| 4,629,378 | 12/1986 | Parsons | 409/224 X |
| 4,679,286 | 7/1987 | Momoi et al. | 29/33 P |
| 4,729,192 | 3/1988 | Elsdoerfer | 409/224 X |
| 4,921,378 | 5/1990 | Kytöla | 409/221 |
| 4,955,463 | 9/1990 | Honma et al. | 29/33 P X |

FOREIGN PATENT DOCUMENTS

| | | |
|---|---|---|
| 2338498 | 3/1975 | Fed. Rep. of Germany . |
| 1253636 | 1/1961 | France ............... 29/38 C |
| 1292824 | 3/1962 | France ............... 409/224 |
| 998471 | 7/1965 | United Kingdom . |
| 1003274 | 9/1965 | United Kingdom . |
| 1435880 | 5/1976 | United Kingdom . |

Primary Examiner—William Briggs
Attorney, Agent, or Firm—Oliff & Berridge

[57] ABSTRACT

A modular multi-fixturing system for a machine tool comprises an elongate core (22) for mounting on a rotary axis of the machine with its longitudinal axis aligned with the rotary axis, and a plurality of workpiece-providing cassettes (24) mounted on the periphery of the core. The core has three flat surfaces on its periphery onto which the cassettes are clamped by fixed and moveable clamping plates (36, 34) which extend along the whole length of the core. The clamping plates define with the flat surfaces axial vee grooves with which corresponding vee surfaces on the cassettes can be engaged by axial movement of the cassettes. The cassettes may carry workpieces and be re-used or may themselves constitute workpieces and be sacrificial.

19 Claims, 2 Drawing Sheets

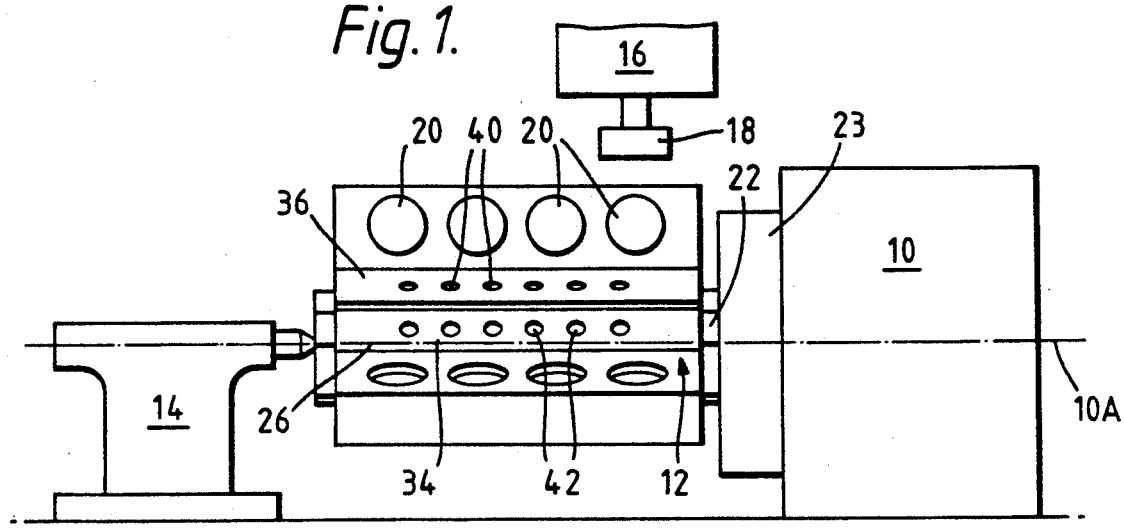
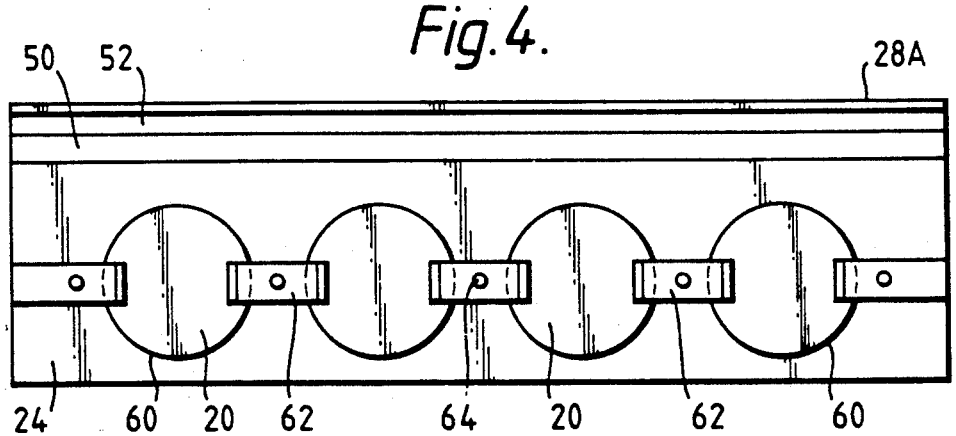
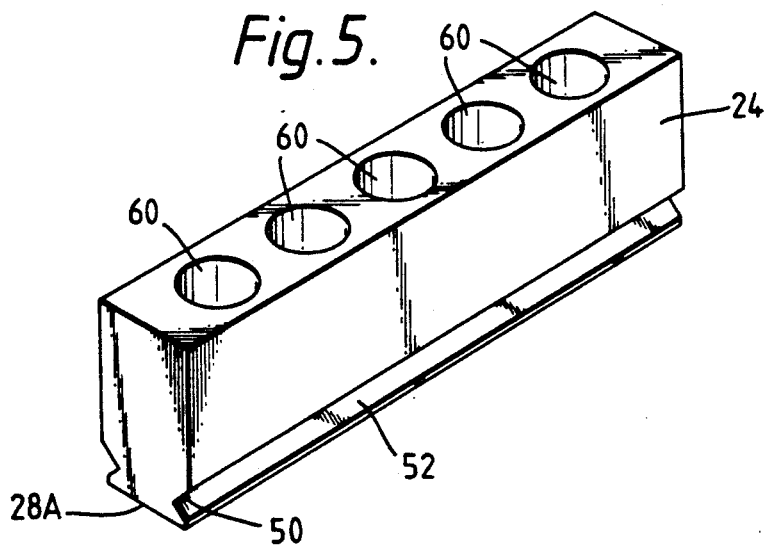

MODULAR MULTI-FIXTURING SYSTEM FOR A MACHINE TOOL

The present invention relates to fixturing systems for machine tools.

It is known in fully automated machine tools to have pallets which carry fixtures on which are mounted several workpieces at a time. The pallets are usually relatively large and flat and are mounted on a pallet changing device which can automatically replace a pallet on the machine after the machining operations are completed with a new pallet carrying more fixtures and another batch of workpieces.

The fixtures are mounted on the flat top surface of the pallet by means of a curvic coupling, or other arrangement, and rigidly clamped. The workpieces are mounted on the fixtures by further clamping devices.

An example of such a pallet system is used on machine tools manufactured and sold by Bridgeport Machines Limited in England.

Such systems are expensive both in terms of capital expenditure and in storage space. The fixtures are usually machined components which include means for holding the workpieces and are usually dedicated to one type of workpiece. Thus for machining different workpieces in batch production several costly fixtures are required.

Also for a 24 hour unmanned production operation, many pallets, each loaded with fixtures have to be stored in a large pallet handling system for automatic loading and unloading onto a machine.

The object of the present invention is to provide a fixturing system which avoids the need for expensive dedicated fixtures for holding workpieces, and which avoids the needs for storage and retrieval of the present large pallets.

In accordance with the present invention in its broadest aspect, there is provided a fixturing system for a machine tool which comprises an elongate core for attachment to a rotary axis of a machine tool with its longitudinal axis substantially parallel to said rotary axis, and at least one workpiece-providing cassette which is detachably secured to the core in such a manner that it projects from the periphery thereof.

By this means the core can remain permanently attached to the machine and only the cassettes need to be stored. Thus the invention avoids the use of conventional pallets and enables the traditional expensive fixture to be replaced by a relatively inexpensive cassette. Also, by having the cassettes mounted on the periphery of the core, and thus offset from the rotary axis, loading and unloading of the cassettes onto the core is facilitated.

The invention is capable of implementation in two alternative embodiments. In one embodiment the cassettes provide the workpieces by having one or more workpiece-locating recesses therein, which may be loaded with workpieces. The cassettes in this embodiment are mounted on the fixture core and removed after the machining operations have taken place to be re-loaded and re-used.

Alternatively the cassettes provide the workpieces by acting as blanks themselves on which one or more components are machined directly. In this embodiment therefore the cassettes are sacrificial or disposable.

Preferably the core has one or more highly accurate cassette-locating features on its periphery and each cassette has complementary locating features thereon whereby the cassettes may be accurately located on the core and may be removed from and replaced on the core by the same or another cassette in the same position. Where the cassettes act as workpiece holders each will further include workpiece-locating features thereon whereby one or more workpieces may be accurately located on each cassette.

However, the methods by which the cassettes are secured to the core, or by which the workpieces may be held on, or in the cassettes, may be many and varied. All kinds of clamping devices and bolting devices are traditionally used for holding fixtures on pallets or for holding workpieces on fixtures, and many would be capable of being used in the present system. The devices may be actuated by hydraulic, pneumatic, magneticm mechanical or other means generally known to those skilled in the art.

The preferred method chosen in the specific embodiments described below is that the cassettes are held in their locations on the core, and the workpieces are held in their locations on the cassettes by clamps operated by bolts.

As with the known pallet loading systems of the prior art, workpieces for the same, or different components can be loaded into cassettes at a location remote from the machine so that once the core has been accurately set up on the machine, the set-up time required at the machine for batches of the same, or different, workpieces can be reduced to the length of time required to replace the cassettes on the core. Since the cassettes are relatively small and easy to handle, the set-up times for loading and unloading cassettes are quite short.

The core may have a plurality of detachable cassettes on its periphery depending on the type of machining operation to be carried out. The number of cassettes chosen is a compromise between having the maximum number of workpieces available on the machine at any time, and allowing the machine to perform as many operations on as many exposed surfaces of the workpieces as possible before having to remove the cassettes.

Since the core is mounted on a rotary axis of the machine, not only can the core be rotated so that each cassette in turn can be presented to the cutting tool, but also different surfaces of the workpieces can be presented for different machining operations.

A further advantage of the invention is that the cassettes may be made of relatively cheap materials for carrying workpieces. For example, aluminium extrusions of constant cross-section can be used which are relatively very cheap to make. Because of this the workpieces may even be machined from the cassettes themselves making them totally disposable.

By suitable design of the cassette locating features on the core and the complementary locating features on the cassettes, the cassettes may be made suitable for manual or automatic loading and unloading onto the machine.

Figure 3:
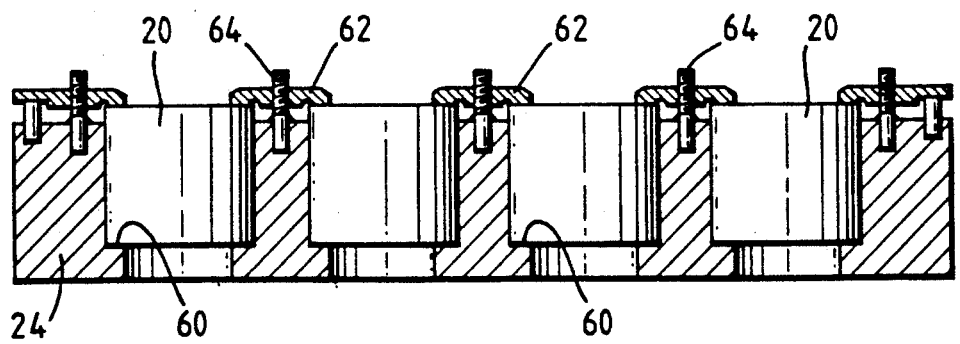

Examples of the invention will now be more particularly described with reference to the accompanying drawings in which:

FIG. 1 is an elevation of part of a machine tool showing the modular multi-fixturing system of the present invention in place, FIG. 2 is an enlarged end view of a modular multi-fixturing system of the present invention, FIG. 3 is a cross sectional plan view in the direction of arrow A of FIG. 2 of a cassette for the system of the present invention with workpieces in position, FIG. 4 is an elevation of the cassette of FIG. 3 in the direction of arrow B of FIG. 2, and FIG. 5 is a pictorial view of a further embodiment of the invention showing a cassette with multiple workpiece locating feature on its top surface.

Referring now to the drawings, in FIG. 1 there is shown part of a vertical spindle CNC machine tool including an indexable head 10, having a rotary axis 10a, a fixture 12 and a tailstock 14 for supporting the fixture at the end opposite the head 10. The machine has a vertically mounted spindle 16 in which may be carried a variety of tools 18 for performing different machining operations on workpieces 20 held in the fixture.

The machine tool may be of any design having either a vertical or horizontal spindle and is not described in detail since the invention is concerned only with the fixturing and the method of its use.

Referring now to FIG. 2 it can be seen that the fixture 12 is of modular construction and is made up of an elongate core 22 on the periphery of which are mounted a plurality of detachable elements referred to as cassettes 24. In the present example there are shown three cassettes mounted at 120° intervals around the axis 26 of the core. The core is provided with a conventional mounting 23 for location in the head 10. The core has a longitudinal axis 26 and is mounted such that the axis 26 is substantially coaxial with or parallel to the rotary axis 10A of the machine.

In order to locate the cassettes on the core 22. The core shown in the present example has three locating features on its outer periphery which are spaced 120° apart and which extend substantially parallel to the axis 26. The locating features consist of three outwardly facing flat surfaces 28 machined on the outer periphery of the core and which extend along its full length and in between which are further pairs of flat surfaces 30 and 32. The flat surfaces 30 and 32 are used to provide cassette-locating features 34 and 36 which, in this example, take the form of active and reactive clamping plates respectively which extend the full length of the core.

The reactive clamping plates 36 are secured by bolts 40 to the surfaces 30 and are intended to remain permanently in position. The active clamping plates 34 are secured by bolts 42 to the surfaces 32 but these plates are intended to be loosened and tightened by means of the screws 42 to enable the cassettes to be detachably mounted to the core. Each of the active and reactive clamping plates 34, 36 is dimensioned to protrude beyond its support surface 32, 30 to present a flat surface portions 34A, 36A for engagement with locating features provided on the cassette. The flat surface portions 34A, 36A subtend an angle of 45° with the surfaces 32, 30 respectively.

The cassettes 24 are each provided with locating features complementary to the locating features on the core. In the present example these take the form of a flat base 28A which engages the flat surface 28 of the core 22 and a vee groove 50, both of which extend the full length of the cassette. The vee grooves have an included angle of 90° so that when the cassette is in place on one of the flat surfaces 28, the vee grooves present locating surfaces 52 at 45° to the surfaces 28 which are engaged by the flat protruding surface portions of the clamping plates 34 and 36.

The angles of the various surfaces 28, 30, 32 and 52 are all accurately made such that for locating and clamping the cassettes 24 on the core 22, all that is necessary is to loosen the bolts 42 on the active clamping plates 34, slide the cassettes axially onto the surfaces 28 with the surfaces 52 of vee grooves 50 under the clamping plates, and then tighten the bolts 42.

Thus it can be seen that once the core 22 has been accurately set up on the head 10, the cassettes 24 can be simply and accurately positioned on the core. By virtue of this simple and novel clamping arrangement, any number of cassettes having the complementary feature of the vee groove surfaces 52 can be attached to and removed from the core and each cassette will have the same position relative to the core as the one it replaces. The set up time at the machine for a new batch of workpieces is therefore simply the amount of time it takes to remove the three cassettes with their finished components and replace them with three new cassettes loaded with new workpieces.

Although the above described novel locating features are preferred for mounting the cassettes on the core because of their low cost and ease of use, there are many other possible alternative ways in which the mounting can be achieved which will occur to the skilled person in the art. For example the core could be provided with pairs of vice-like jaws extending outwardly from its periphery and which are circumferentially moveable by means of hydraulic, pneumatic or mechanical actuators to grip and hold the cassettes. Clearly for such an arrangement areas of the surface of each cassette would have to be suitably prepared. Alternatively a magnetic clamping arrangement can be envisaged to replace the mechanical clamps.

The mechanical clamping arrangement described above uses an external vee groove arrangement on the cassette. Clearly this arrangement could be modified to achieve a similar effect by having an internal or external dovetail slot on the cassette with a corresponding shaped locating feature on the core.

An important aspect of the locating features on the periphery of the core and the cassette is that they preferably have a significant extent in a direction parallel to the rotary axis, so that the cassettes can be loaded and unloaded by movement in a direction parallel to said axis. They are described as extending the full length of the core and the cassette because this arrangement lends itself to making the cassettes from extrusions at minimum cost.

Clearly it is not necessary for the locating features to extend the full length of the core. A simple modification would be to have a plurality of shorter locating features spaced along the length of the core.

Turning now to FIGS. 3 and 4 it can be seen that each cassette 24 consists of a rectangular body with a plurality of aligned workpiece-locating recesses 60 therein. Each recess is provided with location features (not shown) which may be different for different types of workpieces, whereby it is ensured that the workpieces once inserted into the recesses will all be in the same orientation relative to the body.

Between the recesses 60 are provided clamps 62 mounted by means of threaded pillars 64 onto one side surface of the cassette. The clamps hold workpieces 64 in their respective recesses, one clamp being arranged to provide a clamping load at both of its ends on adjacent workpieces.

The recesses 60 may in fact extend completely through the cassette so that both end surfaces of the workpieces are exposed and may be machined without having to remove the workpieces from the cassette or remove the cassette from the core.

Thus it can be seen that if each cassette can locate four workpieces as shown, and three cassettes are attached to the core, the fixturing system of the present invention not only allows twelve workpieces to be presented to the machine at a time, but further batches of twelve workpieces of the same or different types can be accurately located on the core without having to remove it from the machine once it has been set up.

The invention is of particular value for small components where large numbers can be mounted in the cassette using both side faces and end faces of the cassette.

To further reduce the cost of manufacture of components the cassette may be made of relatively cheap materials such as low grade steel or aluminium and are designed with constant cross-section so that an extrusion process can be used. This is not however an essential feature of the invention.

The fixturing system of the present invention also lends itself to a fully automated machine system in that each cassettes with its simple grooved axially extending location features may be automatically loaded onto and unloaded from the core by an axial movement of the cassette.

Thus large numbers of cassettes may be loaded with workpieces and stored on cassettes near the machine. By providing an identifying feature on the cassettes or the workpieces stored in them, or by using a probe or other device on the machine to detect the type of workpiece being loaded, the machine can be pre-programmed to work on a variety of workpieces thus enabling extended periods of unattended operation of the machine.

The fixturing system of the present invention may be mounted vertically on a horizontal spindle machine in which case the tailstock may not be necessary. In automatic loading and unloading of the cassettes on the core the cassettes may be removed together or may have to be indexed around to a location where they can be removed without interference from the core supports.

The number of cassettes on each core is a matter of compromise. Two cassettes at 180° apart provide greatest freedom of movement of the machine spindle around the workpiece but reduces the number of components which can be worked on. Four cassettes would double the number of components which could be worked on but may for a given component restrict the number of operations which may be carried out by the machine.

We have found that for the majority of components three cassettes at 120° apart provides adequate freedom of movement of the machine spindle.

By mounting the fixture on an indexing head or rotary table it is possible to machine either both ends of a component or several sides without removing the component. It is a matter of choice whether all operations are carried out on the components in one cassette before starting on the next, or whether the same machining operation is carried out on all components in all cassettes before changing to the next operation.

In a further alternative embodiment, instead of providing workpiece-locating features on the flanks of the cassettes, FIG. 5 illustrates the position of workpiece-locating features on the exposed top surface of a cassette.

Clearly it is within the scope of this invention to put work-piece locating features in any desired position on the cassette to optimise the machining operations on a workpiece.

The manufacture of each cassette from a simple blank to its finished form is best performed on the same machine that is to be used for subsequent workpiece machining to maintain accuracy of alignment.

Although the embodiment in which the cassettes form the blanks of the workpieces themselves has not been specifically described, this embodiment of the invention is carried out with the cassettes as described above except that the workpiece-locating recesses and clamps are deleted and the machine is programmed to machine one or more components from the resulting rectangular blank 24. The finished components may subsequently be parted off on another machine as a separate operation.

Parting off may, of course, be carried out without removing the components from the machine, or the parts may be separated almost completely on the machine leaving only a thin web to be snapped off after the parts are removed.

I claim:

1. A machine tool comprising:
a machining spindle for carrying a cutting tool;
a head on which a workpiece is to be mounted, the head being indexable about an axis of rotation to bring a workpiece mounted thereon into machining relationship with the cutting tool;
a tailstock;
an elongate core having a longitudinal axis;
means for mounting the core on the head for rotation therewith about said axis of rotation, the core extending between the head and the tailstock with its longitudinal axis coincident with said axis of rotation;
the core having a plurality of radially outwardly disposed faces on its periphery extending parallel to the longitudinal axis of the core, each face having locating surfaces which extend longitudinally of the core to overlie, at least in part, said face;
a plurality of workpiece-providing cassettes configured to engage the locating surfaces of the core;
the location of the faces with respect to the tailstock being such that the workpiece-providing cassettes are loaded onto the core past the tailstock by an axial sliding movement of the cassettes in a direction parallel to the longitudinal axis of the core.

2. A machine tool as claimed in claim 1, wherein clamping means are provided in association with each face of the core for clamping the cassettes on the core.

3. A machine tool as claimed in claim 2, wherein the clamping means comprise elongate clamping plates extending the whole length of the core.

4. A machine tool as claimed in claim 2, wherein each cassette has locating surfaces formed thereon, and the locating surfaces on the core are provided by the clamping means which are releasably engageable with the locating surfaces of the cassettes.

5. A machine tool as claimed in claim 1, wherein each cassette is an extrusion.

6. A machine tool comprising:
a machining spindle for carrying a cutting tool;
a head on which a workpiece is to be mounted, the head being indexable about an axis of rotation to bring a workpiece mounted thereon into machining relationship with the cutting tool;

an elongate core having a longitudinal axis and means for mounting the core on the head with the longitudinal axis of the core coincident with the axis of rotation of the head;

the core having at least one radially outwardly disposed face extending parallel to said longitudinal axis of the core, said face having at least one locating surface extending along the face to overlie, at least in part, said face, whereby the cassette is received on the core by axial movement in a direction parallel to the longitudinal axis of the core;

a workpiece-providing cassette, the cassette comprising an elongate extrusion including a locating portion for engagement with said locating surface of the at least one face and a body portion including means for mounting a plurality of work pieces thereon; and means for releasably securing the cassette on the core.

7. A machine tool as claimed in claim 6, wherein the cassette is an aluminum extrusion.

8. A method of presenting workpieces for machining comprising the steps of:

providing a cutting tool;

providing an elongate core indexable about an axis of rotation, said core having a plurality of outwardly disposed faces parallel to the axis of rotation of the core, each face having at least one locating surface at least in part overlying said face associated therewith;

providing a plurality of elongate workpiece holding cassettes with a plurality of workpieces disposed on each cassette;

mounting one cassette of the plurality of cassettes on each of the faces of the core by sliding each of said cassettes axially along one of the faces of the core to engage the locating surface associated with said one face; and presenting workpieces mounted on the cassettes in a position to be machined by the cutting tool by indexing the core about said axis of rotation.

9. A method as in claim 8, wherein the cassettes comprise extrusions, each extrusion having at least one locating surface, and the step of mounting the cassettes on the faces comprises engaging the locating surface associated with each face with the locating surface of the cassette as the cassette is slid axially along the surface of the core.

10. A method as in claim 8, wherein the step of providing the core includes rotatably mounting one end thereof in a tailstock and the step of mounting the cassettes on the core includes moving the cassettes with an axial sliding movement past the tailstock and onto the core.

11. A fixturing system for a machine tool which has a rotary axis on which a workpiece is to be mounted, said fixturing system comprising:

an elongate core with a longitudinal axis and a periphery, said core having elongate locating features on said periphery which extend substantially parallel to said longitudinal axis;

means for mounting said core on the machine with said longitudinal axis substantially parallel to the rotary axis of the machine;

at least one workpiece-providing cassette adapted to be mounted on said periphery of said core and to extend outwardly therefrom;

means for securing said cassette in a fixed position on said core, whereby said cassette is loaded by an axial loading movement onto said core; and wherein said periphery of said core has at least one outwardly facing plane surface extending parallel to said longitudinal axis and a pair of clamping plates, one of said plates being clamped to each side of said plane surface, each clamping plate being arranged to overlie a portion of said plane surface at an angle thereto to define a pair of V-shaped grooves for engagement with correspondingly shaped surfaces on a cassette.

12. A machine tool comprising:

a machining spindle for carrying a cutting tool;

a head on which a workpiece is to be mounted, the head being indexable about an axis of rotation to bring a workpiece mounted thereon into machining relationship with the cutting tool;

an elongate core having a longitudinal axis and means for mounting the core on the head with the longitudinal axis of the core coincident with the axis of rotation of the head;

the core having at least one radially outwardly disposed face extending parallel to said longitudinal axis of the core;

clamping means overlying a portion of each face of the core and defining therewith a groove extending in a direction parallel to said longitudinal axis of the core over substantially the whole length thereof;

a workpiece-providing cassette having a locating surface thereon which is shaped to be received in a said groove by relative sliding movement between the cassette and the core in a direction parallel to the longitudinal axis of the core;

said clamping means being operable for releasably securing the cassette on the core.

13. A machine tool comprising:

a machining spindle for carrying a cutting tool;

a head on which a workpiece is to be mounted, the head being indexable about an axis of rotation to bring a workpiece mounted thereon into machining relationship with the cutting tool;

an elongate core having a longitudinal axis and means for mounting the core on the head with the longitudinal axis of the core coincident with the axis of rotation of the head;

the core having a plurality of radially outwardly disposed faces extending parallel to said longitudinal axis and spaced angularly about the periphery of the core, each of said faces having locating surfaces thereon which extend longitudinally of the core to overlie, at least in part, said faces;

a plurality of elongate workpiece-providing cassettes each having a longitudinal axis and comprising a body portion and a base portion, the base portion being formed with elongate locating surfaces thereon which extend in the direction of the longitudinal axis of the cassette and which are engageable with the locating surfaces on any one of the faces of the core by an axial sliding movement of the cassette in the direction of the longitudinal axis of the core;

clamping means provided in association with each face of the core for clamping a cassette on the core; and means located on the body portion of each cassette for mounting a plurality of workpieces thereon.

14. A machine tool as claimed in claim 13, wherein the cassettes are extrusions and the locating surfaces on the cassettes are integrally formed on the base thereof.

15. A machine tool as claimed in claim 13, wherein the clamping means extends the whole length of the respective face of the core.

16. A machine tool as claimed in claim 13, wherein the locating surfaces on each face of the core are defined by the clamping means in association with the respective face of the core.

17. A machine tool as claimed in claim 12, wherein the cassette includes means for mounting a plurality of workpieces thereon.

18. A machine tool as claimed in claim 12, wherein the cassette is an extrusion.

19. A machine tool as claimed in claim 18, wherein the cassette is an aluminum extrusion.

* * * * *